US011527894B1

(12) United States Patent
Ambrose et al.

(10) Patent No.: US 11,527,894 B1
(45) Date of Patent: Dec. 13, 2022

(54) METHODS AND APPARATUS FOR OPTIMIZING EFFICIENCIES OF A SOLAR POWER SYSTEM

(71) Applicant: OPTIVOLTS LLC, Waco, TX (US)

(72) Inventors: Vincent Ambrose, Waco, TX (US); George Kuo, Scotts Valley, CA (US)

(73) Assignee: OPTiVOLTS, LLC, Waco, TX (US)

( * ) Notice: Subject to any disclaimer, the term of this patent is extended or adjusted under 35 U.S.C. 154(b) by 0 days.

(21) Appl. No.: 17/857,599

(22) Filed: Jul. 5, 2022

(51) Int. Cl.
*H02J 3/00* (2006.01)
*H02J 1/00* (2006.01)
*H02J 3/38* (2006.01)
*H02J 3/46* (2006.01)

(52) U.S. Cl.
CPC ............... *H02J 3/381* (2013.01); *H02J 3/46* (2013.01); *H02J 2300/26* (2020.01)

(58) Field of Classification Search
CPC ........... H02J 3/381; H02J 3/46; H02J 2300/26
See application file for complete search history.

(56) References Cited

U.S. PATENT DOCUMENTS

2012/0025621 A1* 2/2012 Seymour ............. H01L 31/0504
  307/81
2017/0353150 A1* 12/2017 Alon ..................... H02G 3/081

* cited by examiner

*Primary Examiner* — Toan T Vu
(74) *Attorney, Agent, or Firm* — Law Office of John Stattler

(57) ABSTRACT

A plurality of photovoltaic (PV) modules are configured into a PV string to generate a PV string voltage in a solar power system. The number of PV modules per PV string is based on operating conditions at the solar power system site and cause the PV string voltage to exceed a maximum voltage specification when operating at the lowest expected ambient temperature at the site, but only exceeds the maximum voltage specification for a limited number of occurrences for which the operating conditions at the site cause the PV string voltage to exceed the maximum voltage specification. Under control of a string voltage control circuit, voltage bypass circuits selectively bypass the bypass photovoltaic module so as to eliminate the PV module from the PV string voltage when the operating conditions at the site cause the PV string voltage to exceed the maximum voltage specification.

18 Claims, 13 Drawing Sheets

| # of Modules/string | Average Operating Voltage | | | | | | | | | | | | |
|---|---|---|---|---|---|---|---|---|---|---|---|---|---|
| 45 | 1,439 | 1,444 | 1,449 | 1,454 | 1,459 | 1,464 | 1,469 | 1,474 | 1,479 | 1,484 | 1,489 | | OPTIVOLTS Dynamic Design |
| 44 | 1,407 | 1,412 | 1,417 | 1,421 | 1,426 | 1,431 | 1,436 | 1,441 | 1,446 | 1,451 | 1,456 | | |
| 43 | 1,375 | 1,380 | 1,384 | 1,389 | 1,394 | 1,399 | 1,403 | 1,408 | 1,413 | 1,418 | 1,423 | | |
| 42 | 1,343 | 1,348 | 1,352 | 1,357 | 1,361 | 1,366 | 1,371 | 1,375 | 1,380 | 1,385 | 1,389 | | |
| 41 | 1,311 | 1,316 | 1,320 | 1,324 | 1,329 | 1,334 | 1,338 | 1,343 | 1,347 | 1,352 | 1,356 | | |
| 40 | 1,279 | 1,283 | 1,288 | 1,292 | 1,297 | 1,301 | 1,305 | 1,310 | 1,314 | 1,319 | 1,323 | | |
| 39 | 1,247 | 1,251 | 1,256 | 1,260 | 1,264 | 1,269 | 1,273 | 1,277 | 1,281 | 1,286 | 1,290 | | |
| 38 | 1,215 | 1,219 | 1,223 | 1,228 | 1,232 | 1,236 | 1,240 | 1,244 | 1,249 | 1,253 | 1,257 | | |
| 37 | 1,183 | 1,187 | 1,191 | 1,195 | 1,199 | 1,203 | 1,208 | 1,212 | 1,216 | 1,220 | 1,224 | | |
| 36 | 1,151 | 1,155 | 1,159 | 1,163 | 1,167 | 1,171 | 1,175 | 1,179 | 1,183 | 1,187 | 1,191 | | |
| 35 | 1,119 | 1,123 | 1,127 | 1,131 | 1,135 | 1,138 | 1,142 | 1,146 | 1,150 | 1,154 | 1,158 | | |
| 34 | 1,087 | 1,091 | 1,095 | 1,098 | 1,102 | 1,106 | 1,110 | 1,113 | 1,117 | 1,121 | 1,125 | | |
| 33 | 1,055 | 1,059 | 1,062 | 1,066 | 1,070 | 1,073 | 1,077 | 1,081 | 1,084 | 1,088 | 1,092 | | |
| 32 | 1,023 | 1,027 | 1,030 | 1,034 | 1,037 | 1,041 | 1,044 | 1,048 | 1,051 | 1,055 | 1,059 | | Passive Design |
| | 24 | 23 | 22 | 21 | 20 | 19 | 18 | 17 | 16 | 15 | 14 | | |
| | Ave Ambient Temperature | | | | | | | | | | | | |

FIG. 3

Example Passive System Design for Voltage Optimization 32 mods x 34.1Vmp/mod= 900-1100V average voltage Example Active System Design for Voltage Optimization 44 mods x 34.1Vmp/mod= 1300-1500V average voltage

METHODS AND APPARATUS FOR OPTIMIZING EFFICIENCIES OF A SOLAR POWER SYSTEM

BACKGROUND

Field

The present disclosure is directed towards a solar power system, and more particularly, towards optimizing efficiencies of solar power systems.

Background

Solar power systems harvest energy from photovoltaic (PV) panels or modules, which generate energy from photovoltaic cells. Typically, solar power systems are configured to collect energy from a number of photovoltaic panels by connecting a string of PV panels in a series connection. The output of a string of PV panels is measured, in part, by the voltage it produces, referred to as the PV string voltage.

Typically, solar panel systems are designed to operate within an electrical code, such as the National Electric Code (NEC). For example, a standard architecture of a PV string is governed by NEC, section 690.7", "Maximum Voltage." It reads "in a dc PV source circuit or output circuit, the maximum PV system voltage for that circuit shall be calculated as the sum of the rated open-circuit voltage of the series-connected PV modules corrected for the lowest expected ambient temperature." This electrical code is very conservative in that if a solar power system is designed in accordance with it, then the string voltage is limited, which lowers efficiencies of the solar power system.

As described more fully below, the present disclosure sets for methods, circuits and systems to optimize efficiencies of a solar power system.

BRIEF DESCRIPTION OF THE DRAWINGS

FIG. 3 depicts a chart showing the average operating voltage based on ambient temperature.

DETAILED DESCRIPTION

Electric codes, governing electrical standards of solar power systems, such as the National Electric Code (NEC), set forth conservative electrical standards for solar power systems in two key areas. First, the specification references voltage measurements taken as a voltage open circuit (VOC), which is very conservation theoretical measurement. A more real-world electrical measurement of PV string voltage is the "voltage maximum power point" (Vmp). In addition to the type of voltage measurement, the NEC guidelines are conservative by referencing, with respect to determining a maximum PV string voltage, the lowest historical ambient temperature for which the solar power system operates.

However, in practice, solar power systems rarely operate at the lowest historical ambient temperature for which the system may be exposed, and thus it is not representative of the real-world operating conditions of photovoltaic panels. For example, the average difference between the ambient temperature and the lowest historical ambient temperature is 30° C. Thus, if the lowest historical ambient temperature is used to design the PV string voltage, then the solar power system will be designed to significantly underperform the potential of the modules on the PV string.

In National Electrical Code (NEC) (Section 690.7B DC-to-DC Converter Source and Output Circuits) in a dc-to-dc converter source and output circuit, the maximum voltage shall be calculated in accordance with 690.7(B)(1) (Single DC-to-DC Converter), which reads for circuits connected to the output of a single dc-to-dc converter, the maximum voltage shall be the maximum rated voltage output of the dc-to-dc converter. As is explained fully below, the present disclosure sets forth systems, methods and apparatus that realize maximum voltage efficiency by actively, as opposed to using a passive design, managing the voltage and current, thus maintaining safety of the solar power system.

The output voltage of a PV module is dependent upon both irradiance (i.e. the energy per unit of time incident on the surface of the module) and temperature of the module. The ambient temperature of the PV modules is a primary factor in determining the output voltage it produces.

Figure 1:
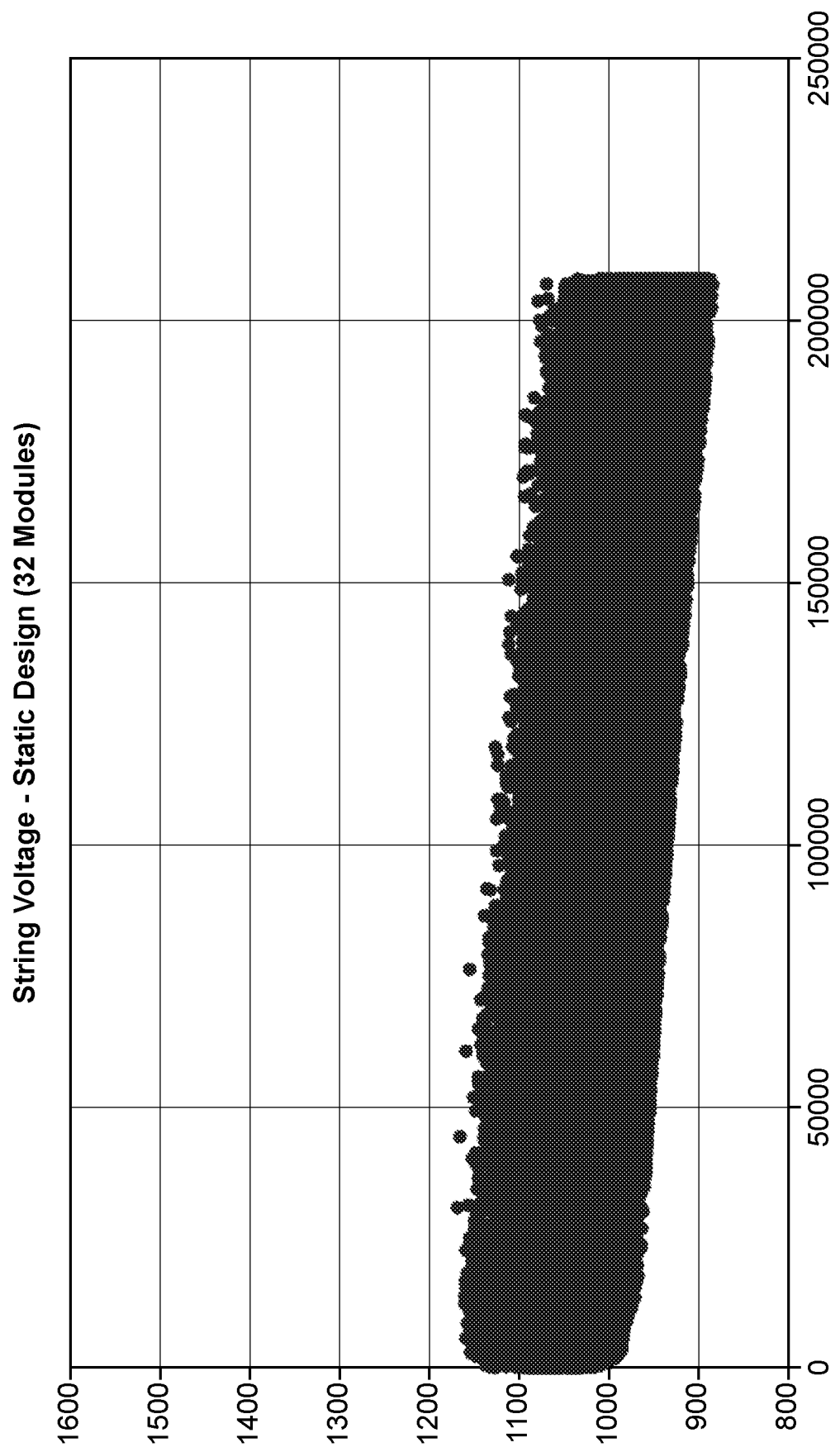
FIG. 1 shows a graph that depicts PV string voltage as a function of occurrences in a solar PV system at an example site installation.

FIG. 1 shows a graph that depicts PV string voltage as a function of occurrences in a solar PV system at an example site installation. Specifically, the graph depicts the distribution, measured over a period of time, of a number of occurrences versus the string voltage for a PV string containing 32 modules. The distribution graph of FIG. 1 shows a PV string voltage of approximately 1096 volts, @ 34.7 Vmp.

Figure 2:
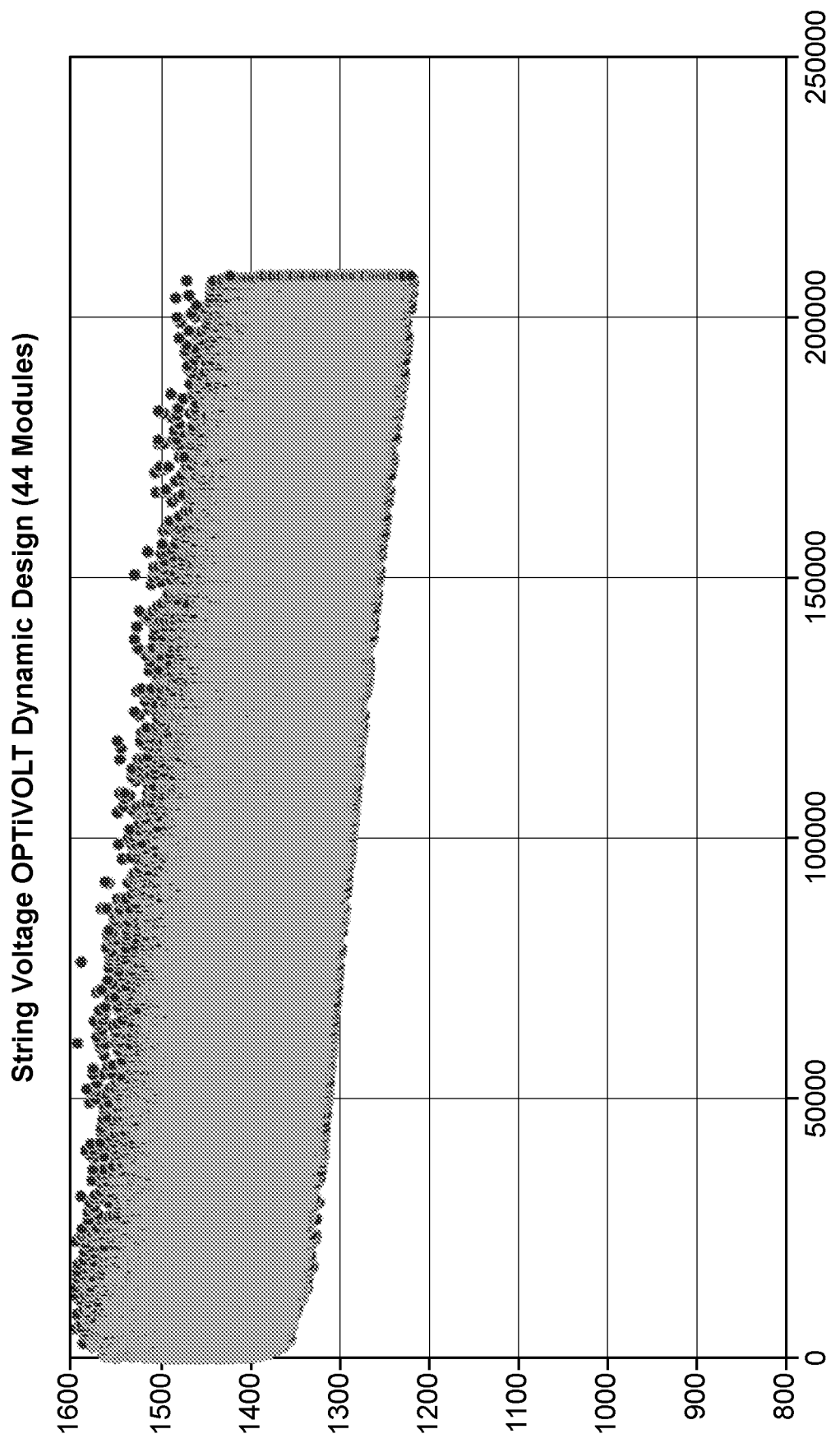
FIG. 2 is a graph depicting PV string voltage as a function of occurrences.

FIG. 2, similar to FIG. 1, is also a graph depicting PV string voltage as a function of occurrences. While the graph of FIG. 1 depicts string voltage for a PV string constructed of 32 modules, the graph of FIG. 2 reveals a PV string voltage of approximately 1400 volts @ 34.7 Vmp.

FIG. 3 depicts a chart showing the average operating voltage based on ambient temperature. As shown in FIG. 3, a PV string, which consists of 32 modules, has an average PV string voltage of 878 volts at 24° C., whereas it has an average PV string voltage of 1073 volts under an average ambient temperature of 14° C. A larger number of modules, of course, produce higher PV string voltages as seen in the graph of FIG. 3. Specifically, a 44 module solar power system has an average PV string voltage of 1207 volts, with an ambient temperature of 24° C., and an average PV string voltage of 1475 volts, under an ambient temperature of 14° C.

Figure 4:
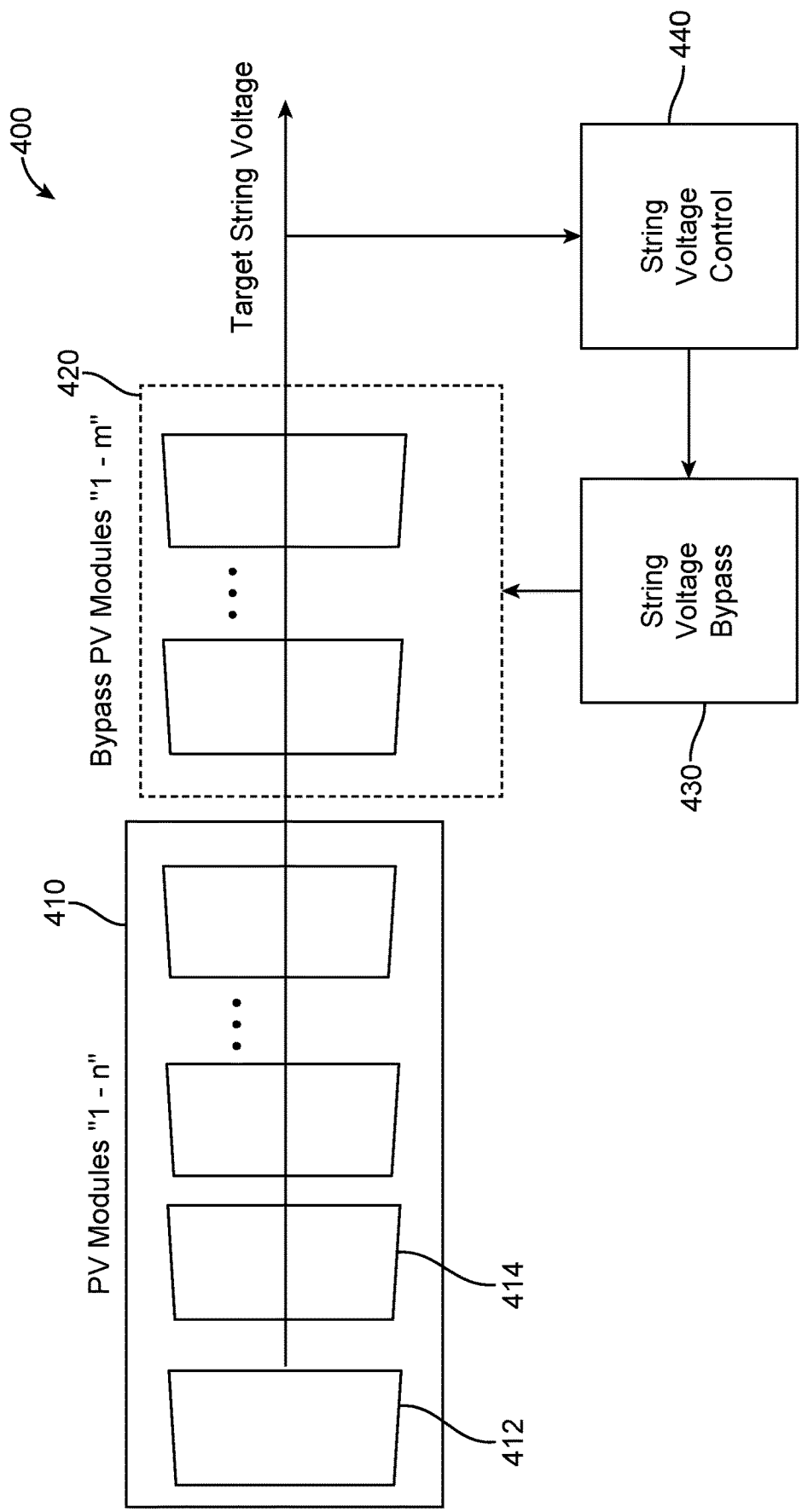
FIG. 4 Illustrates a solar power string in a solar power system configured in accordance with the teachings of the present disclosure.

FIG. 4 Illustrates a solar power string in a solar power system configured in accordance with the teachings of the present disclosure. The example solar power system (400) includes a plurality of PV modules 410 (i.e., "1 to n" number of PV modules) that are configured on a single string of PV modules. The solar string (400) further includes bypass PV modules (420)(i.e., "1-m" bypass PV modules). The number of PV modules and bypass PV modules determine, under different operating conditions, the target string voltage for the string of PV and bypass PV modules (410 and 420). Designing a system to optimize the target string voltage by selecting a configuration of the PV modules (410) and the bypass PV modules (420) is referred to herein as the "active design." Thus, the active design includes selection of a number of total PV modules, including PV modules (410) and bypass PV modules (420).

The string of PV modules (400) further includes a string control voltage module (440) and a string voltage bypass module (430). In general, the string control voltage module (440) monitors the "target string voltage", and if the target string voltage exceeds a threshold voltage (i.e., a maximum voltage allowed by the regulations), then the string control voltage module (440) triggers the string voltage bypass module (430) to eliminate one or more bypass PV modules (420) from the PV string, so that the target string voltage does not exceed the maximum voltage.

Figure 5A:
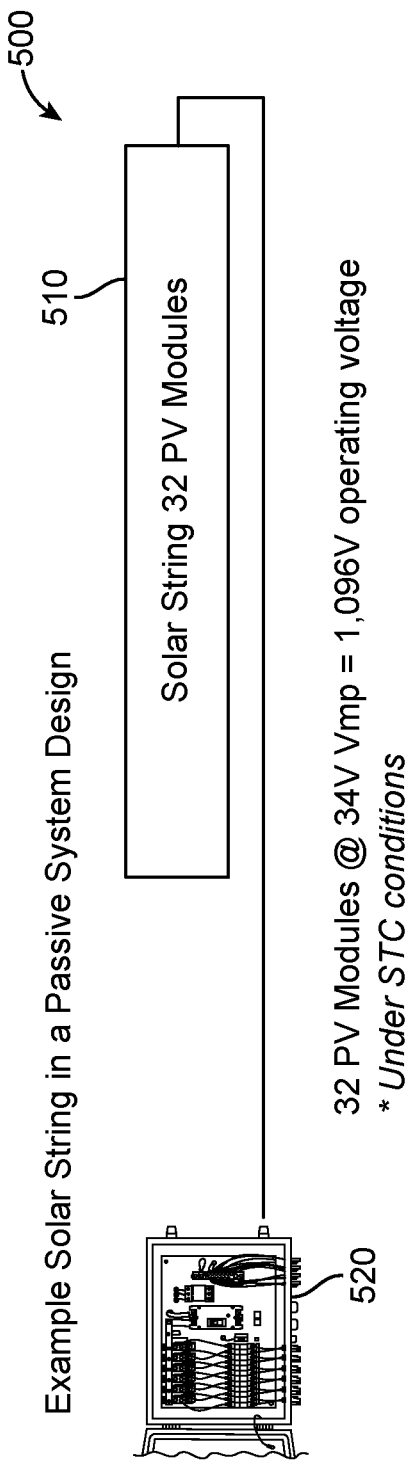
FIG. 5A illustrates an example of a portion of a solar power system designed and configured in accordance with a Passive System Design.

FIG. 5A illustrates an example of a portion of a solar power system designed and configured in accordance with a "Passive System Design." The PV module string (510), consisting of 32 PV modules, is designed to operate at a target string voltage of 1096 V, based on the lowest ambient temperature of the site. For this example, the passive system design system (500) includes, along with the 32 PV modules (510) connected in series, a junction box (520) connecting the PV module string through a home run bus (530).

In a situation where a combination of increased irradiance and decreased ambient temperature increases the voltage of each individual PV module, the PV string voltage, designed using the passive system design, will still operate below maximum operating voltage.

Figure 5B:
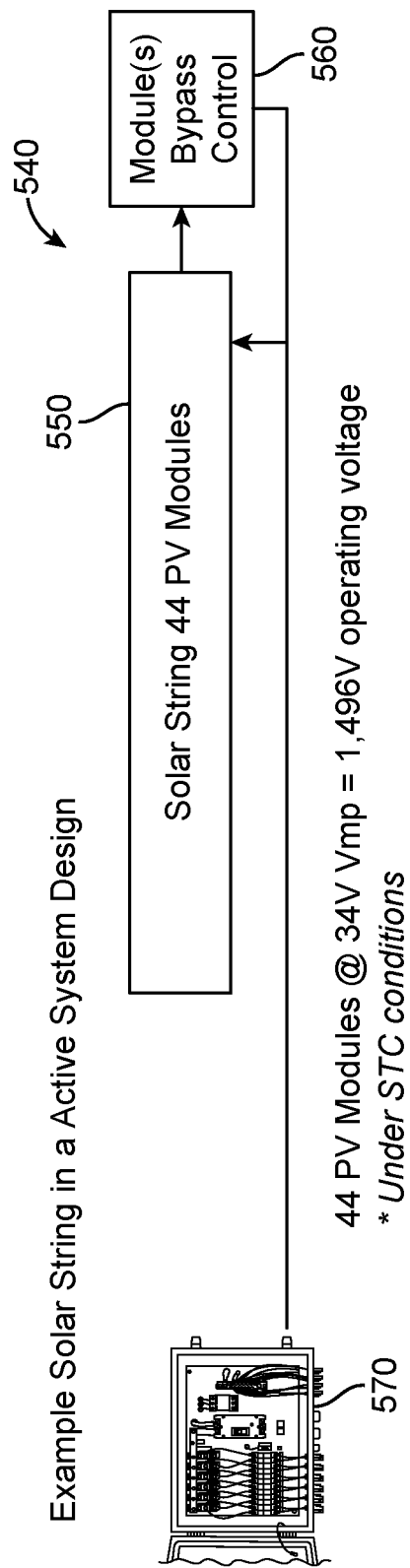
FIG. 5B illustrates an example portion of a solar power system configured in accordance with an Active System Design.

FIG. 5B illustrates an example portion of a solar power system configured in accordance with an Active System Design. For this example, based on the site (i.e., location of the solar power system) and the configuration of the solar power system, a target string voltage of 1496 V is achieved when operating under favorable temperature and irradiance conditions. Using 1496 V as the target string voltage leads to an active design and configuration of a PV module string of 44 modules (i.e., 44 modules are coupled in series to create a PV module string). The string of PV modules is coupled to a junction box (570), via a home run bus (560).

In a situation where a combination of increased irradiance and decreased ambient temperature increases the voltage of each individual panel so as to exceed STC conditions, systems, configured in accordance with the teachings of the present disclosure, temporarily disconnect one or more PV modules (550), via module(s) bypass control 560, to continue to operate below maximum operating voltage.

Figure 6:
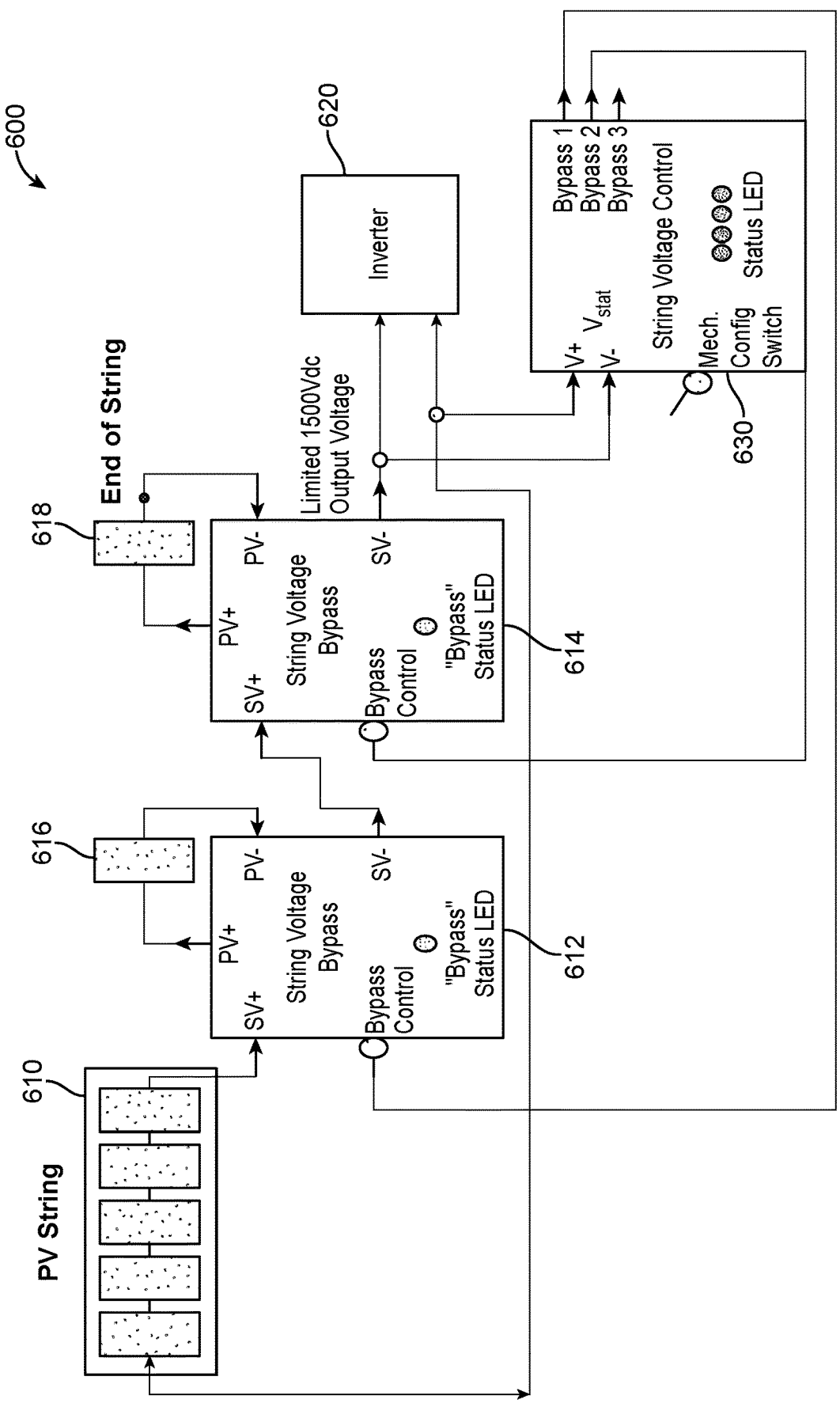
FIG. 6 illustrates an exemplary circuit for a solar power system configured in accordance with the present disclosure.

FIG. 6 illustrates an exemplary circuit for a solar power system configured in accordance with the present disclosure. Solar power system 600 includes a plurality of photovoltaic modules, configured into a serial PV string (610). The number of PV modules contained in PV string (610) is determined in accordance with the active system design methodology (as discussed above). In addition to the PV modules in PV string (610), the solar power system 600 further includes one or more bypass PV modules. For the example shown in FIG. 6, the solar power system (600) contains 2 bypass PV modules; namely, bypass PV modules 616 and 618. Although the example of FIG. 6 illustrates two PV bypass modules, any number of bypass PV modules may be incorporated without deviating from the spirit or scope of the invention.

As shown in FIG. 6, the PV string (610) incorporates the bypass PV modules (616 and 618), into a single string of PV modules (referred to herein as "total PV string") through string voltage bypass circuits 612 and 614. The power output of the PV string, at SV− on string voltage bypass circuit 614, is input to inverter (620). The voltage at the SV− terminal on string voltage bypass circuit (614) constitutes the string voltage for both the PV string (610) and the bypass PV string (616 and 618).

For this example system, the maximum string voltage (from both the PV string and the bypass PV string) is 1500 vdc. If the string voltage input to inverter (620) does not exceed 1500 Vdc, then string voltage bypass circuits (612 and 614) connect bypass PV modules (616 and 618) through the PV+ and PV− connections, as shown in FIG. 6. The string voltage bypass circuits (612 and 614) further include a bypass status LED, to indicate whether the associated bypass PV module has been eliminated from the total PV string.

The string voltage control (630) monitors the string voltage to determine whether the string voltage exceeds the maximum value (e.g., 1500 Vdc). As shown in FIG. 6, the string voltage input to inverter 620 is also input to the $V_{stat}$ input on string voltage control (630). The string voltage control 630 provides status regarding such items as whether the maximum string voltage has been exceeded, whether one or more bypass circuits have been deactivated, etc. The string voltage control (630) also includes, for this example, a mechanical configuration switch to allow manual control of string voltage bypass circuits (612 and 614).

As shown in FIG. 6, string voltage control module (630) is coupled to string voltage bypass circuits (612 and 614) through a bypass control input. In operation, when the string voltage control module (630) senses that the string voltage approaches the maximum string voltage, the string voltage control module (630) signals, to the bypass control input on string voltage bypass circuits (612 and 614), to eliminate one or more of the bypass PV modules. For example, if the string voltage exceeds the maximum voltage allowed by a first predetermined amount, then the string voltage control (630) may signal the string voltage bypass circuit (614) to eliminate bypass PV module (618) from the total PV string output. If, however, the string voltage exceeds the maximum voltage allowed by a second and higher predetermined level, then the string voltage control (630) may signal the string voltage bypass circuit 612 to eliminate a second bypass PV module, bypass PV module 616.

Figure 7:
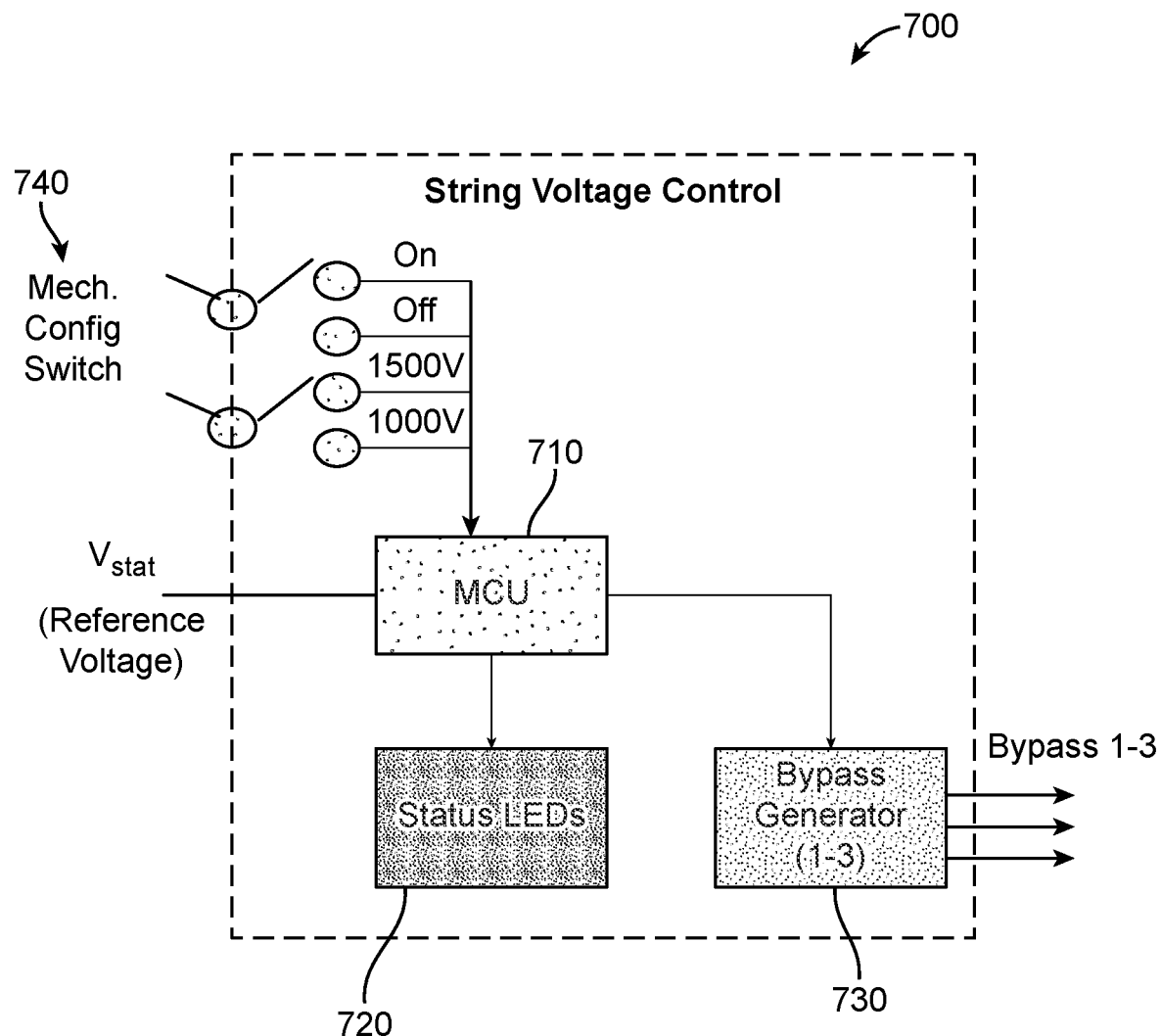
FIG. 7 illustrates an example string voltage control used in the solar power system of the present disclosure.

FIG. 7 illustrates an example string voltage control used in the solar power system of the present disclosure. As shown in FIG. 7, the string voltage control (700) includes a mechanical configuration switch (740). The mechanical configuration switch (740) provides a means to program the string voltage control (700) to limit the total PV string to a predetermined voltage. For example, the string voltage control (700) may be set not to exceed a string voltage of a predetermined value, such as 1500 V or 1000 V. The string voltage control (700) may be programmed to set any maximum voltage value. Although the illustration in FIG. 7 shows programming the string voltage control (700) via a mechanical configuration switch (740), any means of programming the string voltage control (700) may be used without deviating from the spirit or scope of the invention. For example, string voltage control (700) may be controlled remotely, via a port on the string voltage control (700) configured to receive binary information, such as information transmitted by a wired connection, or even information transmitted by a wireless connection, controlled from a system control device.

String voltage control (700) receives a reference voltage, $V_{stat}$, for input to microcontroller unit (MCU) 710. Also input to MCU 710 is the output of the mechanical configuration switch (740). In turn, the MCU 710 compares the reference voltage, $V_{stat}$ (the total PV string output) to a voltage value set by the mechanical configuration switch (740). If the MCU (710) detects that the $V_{stat}$ is above the voltage value set by mechanical configuration switch (740), then the MCU 710 programs the bypass generator (730) to signal the string voltage bypass circuits accordingly (e.g., string voltage bypass circuits 612 and 614 in FIG. 6). As such, the bypass generator (730) may be set to bypass no bypass PV modules, or it may be set to bypass one or more bypass PV modules.

The string voltage control (700) includes, for this example, status LEDs (720), which provide status of the activation, or deactivation, of the bypass PV modules from the string. For example, the status LEDs (720) may indicate that one bypass PV module has been eliminated from the total PV string.

Figure 8:
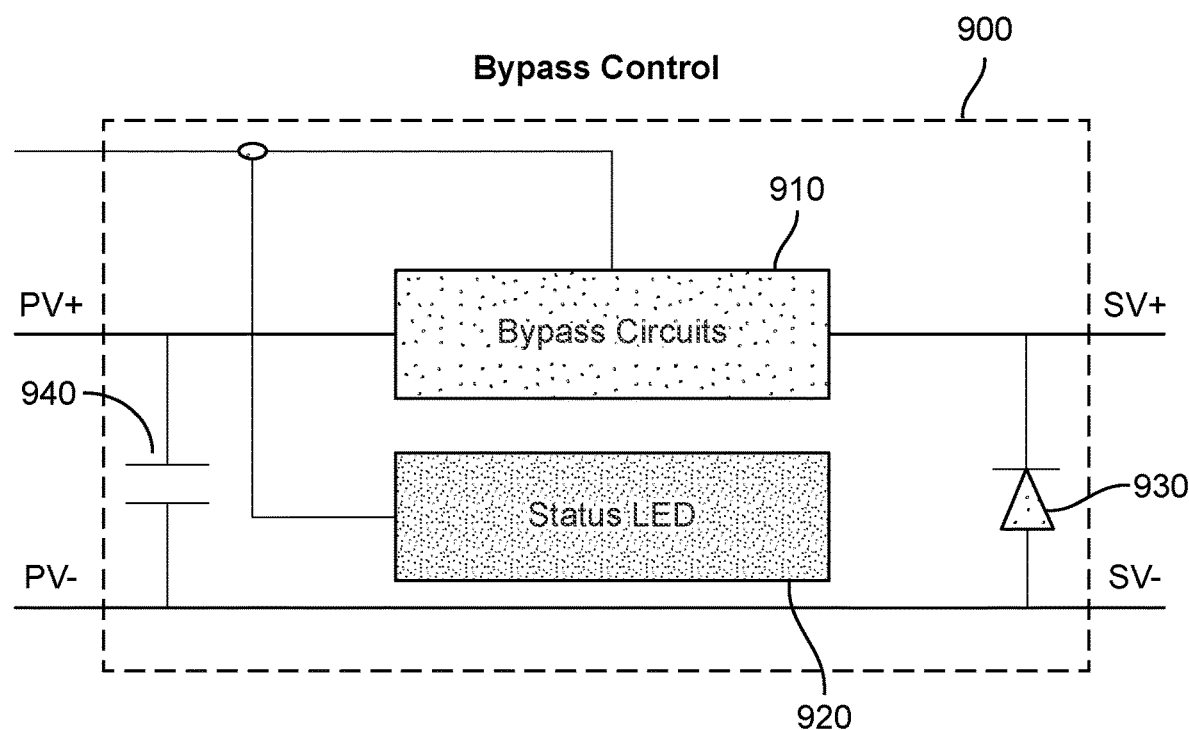
FIG. 8 illustrates a string voltage bypass circuit configured in accordance with one embodiment of the present disclosure.

FIG. 8 illustrates a string voltage bypass circuit configured in accordance with one embodiment of the present disclosure. As shown in FIG. 8, string voltage bypass circuit (900) serially couples two PV modules such that the power output of a PV module is input to the string voltage bypass circuit (900) through the PV+ and PV− terminals. Also, the string voltage bypass circuit (900) selectively couples the power from the PV+ and PV− terminals to a subsequent PV module on the string, via the SV+ and SV− terminals. Any type of bypass circuit, illustrated as bypass circuits (910) in FIG. 8, which decouples the PV+ and PV− terminals from the SV+ and SV− terminals may be used. The string voltage bypass circuit (900) further includes a capacitor (940) and a diode (930) coupled, in parallel, across the PV+ and PV− terminals.

Figure 9:
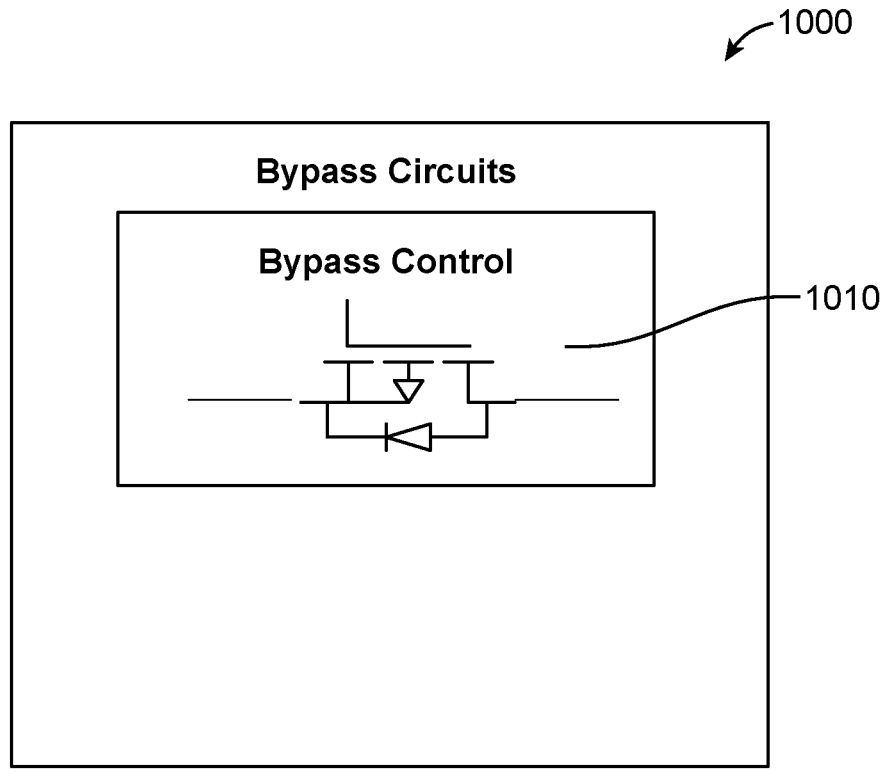
FIG. 9 illustrates one example of a bypass circuit, as used in the bypass control circuit depicted in FIG. 8.

FIG. 9 illustrates one example of a bypass circuit, as used in the bypass control circuit depicted in FIG. 8. Bypass circuit 1000 includes a "switch", to couple, or decouple, the terminal voltage from a previous PV module to a subsequent PV module in the PV string. In some embodiments, the bypass circuit (1000) may include, as bypass control (1010), a field effect transistor (FET), or other semiconductor device, such as other types of transistors, that permit connecting and disconnecting the power between two PV modules, connected in series.

Figure 10A:
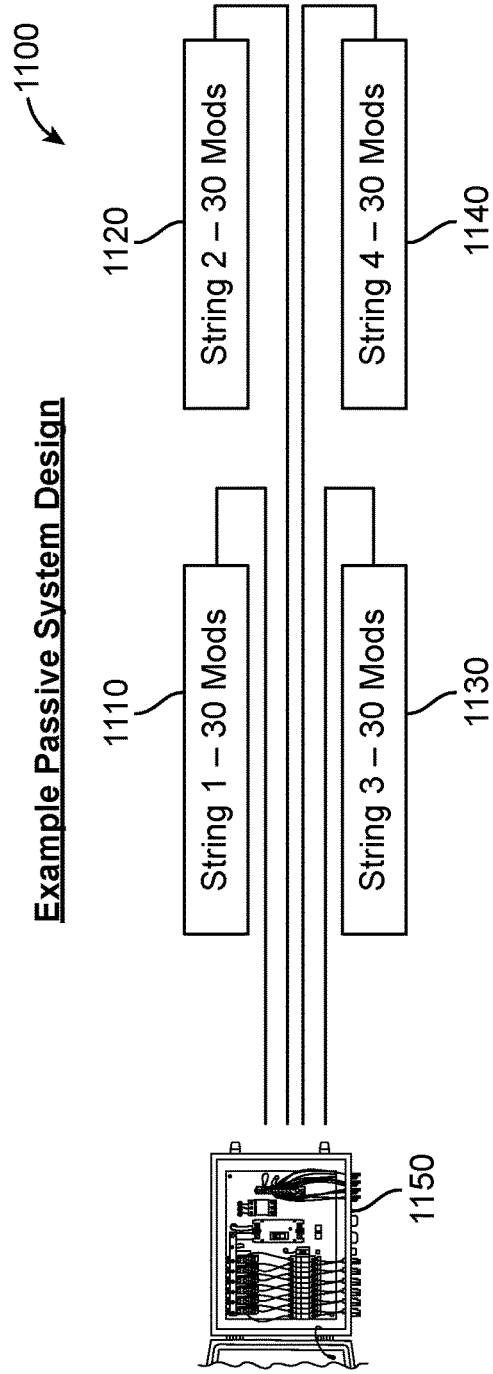
FIG. 10A illustrates an example solar power system configured in accordance with a passive system design.

FIG. 10A illustrates an example solar power system configured in accordance with a passive system design. For this example, solar power system (1100) includes four PV strings (1110, 1120, 1130 and 1140) input to a collection box (1150). With a passive system design, the solar power system is designed to include a maximum number of PV modules without exceeding the lowest ambient temperature at the site. As shown in FIG. 10A, strings 1 through 4 each include 30 modules.

Figure 10B:
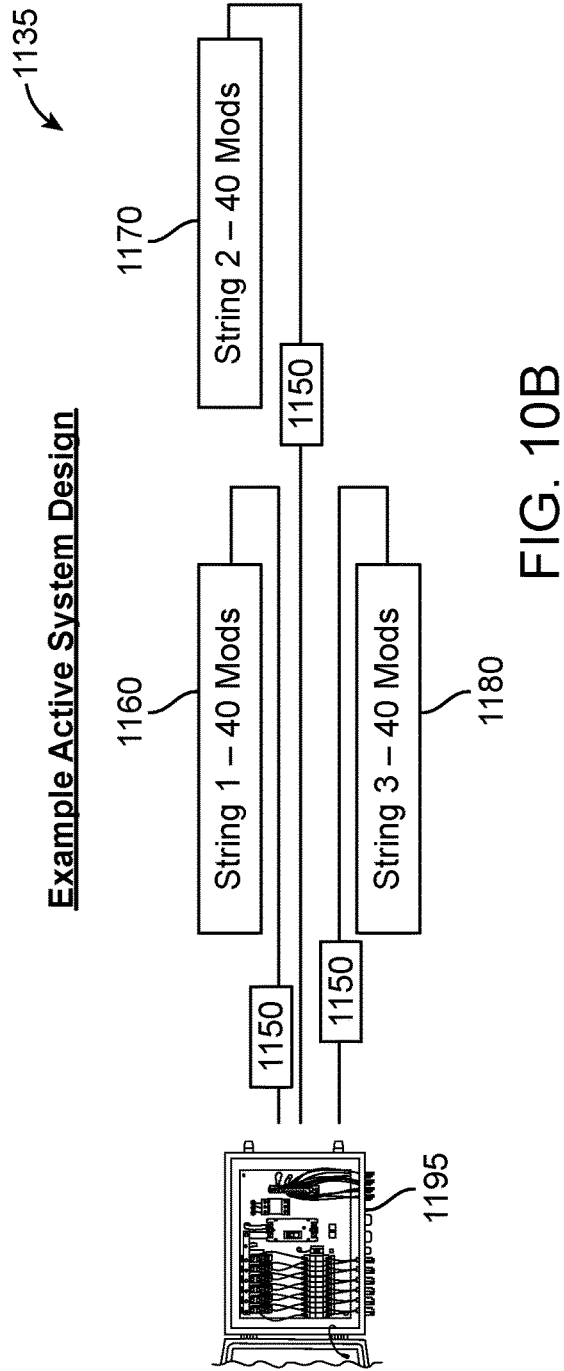
FIG. 10B illustrates an example solar power system configured in accordance with the teachings of the active system design of the present disclosure.

FIG. 10B illustrates an example solar power system configured in accordance with the teachings of the active system design of the present disclosure. The solar power system (1135) contains 3 PV strings (1160, 1170 and 1180), connected to a collection box (1195) through home run returns. In addition, the solar power system (1135) includes module(s) bypass control (1150) to eliminate modules from the PV string, as necessary. Using the active system design methodology, solar power system (1135) incorporates 40 PV modules per PV string, a 33% increase in the number of PV modules per string in a solar power system configured in accordance with the passive system design methodology.

Solar power systems, configured in accordance with the active system design, contain fewer PV strings in the solar power system. Fewer PV strings in the solar power system, including a significant reduction of PV strings in large solar power plants, results in a significant savings. For example, solar power systems that utilize the active system design of the present disclosure require less PV wire, connectors, combiner boxes, and trenching. For the example passive system design and active system design systems illustrated in FIGS. 10A and 10B, there are 25% fewer home runs, up to 20% less PV wire used, 25% less combiner boxes (connections), 25% less connectors, less trenching (site-specific), and 25% less labor hours for electricians. The active system design systems also require less labor to install the electrical balance of system.

Figure 11A:
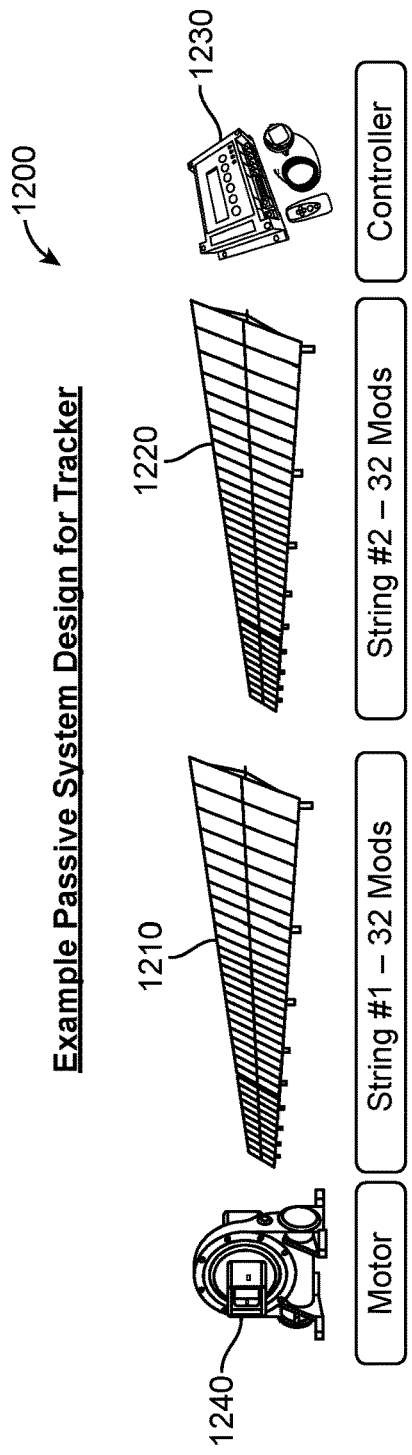
FIGS. 11A and 11B illustrate a comparison between solar power systems using the active and passive system design when a solar power system uses a tracker.
Figure 11B:
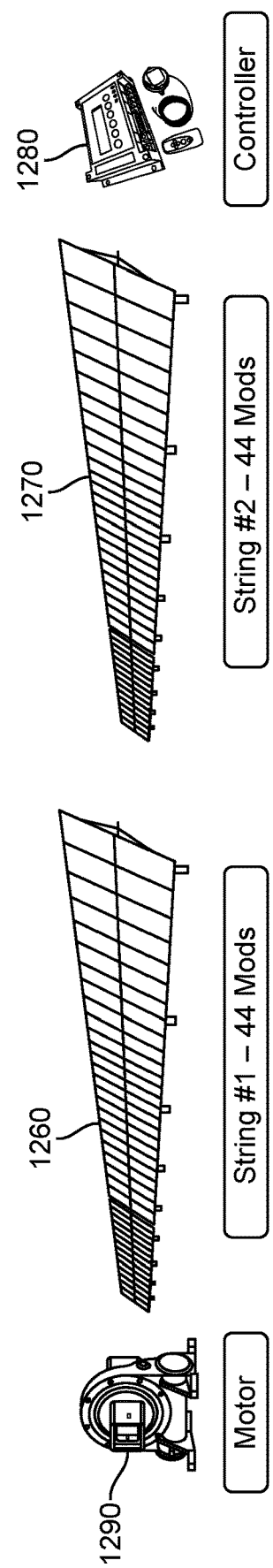

FIGS. 11A and 11B illustrate a comparison between solar power systems using the active and passive system design when the solar power system use trackers. Solar power system (1200), configured in accordance with the passive system design methodology, includes two strings of 32 PV modules per string (1210 and 1220). As shown in FIG. 11A, each string (1210 and 1220) is deployed on a single tracker. As is well known, trackers are used to optimize the irradiation on the surface of the PV panels as the sun moves across the sky. As shown, the solar power system (1200) includes a controller (1230), to control the tracking system and a motor (1240) to power the trackers for movement.

FIG. 11B illustrates an example solar power system (1250) configured in accordance with the tracker system design methodology of the present disclosure. Using the active system design methodology, solar power system (1250) incorporates 44 PV modules per string, as shown. As such, 44 PV modules are configured on each tracker, as opposed to the 32 PV modules configured on each tracker in the solar power system (1200) configured in accordance with the passive system design methodology. Solar power system (1250), like solar power system (1200), includes infrastructure that consists of a controller (1280) and a motor (1290). Accordingly, with the same cost to implement a tracker system, the active system design (solar power system 1250) implements 88 modules on a tracking system, whereas solar system 1200, implemented with the passive system design, includes only 64 PV modules for the same tractor infrastructure. For the example passive system design and active system design system illustrated in FIGS. 11A and 11B, utilizing the same motor and control infrastructure, the active system design increases the power per tracker, thereby lowering the number of trackers in a PV plant, and correspondingly lowering the number of tracker motors and controllers by up to 20%, which, in turn, lowers overall PV plant costs. Therefore, the active system design provides efficiencies for solar power systems that implement trackers.

Figure 12A:
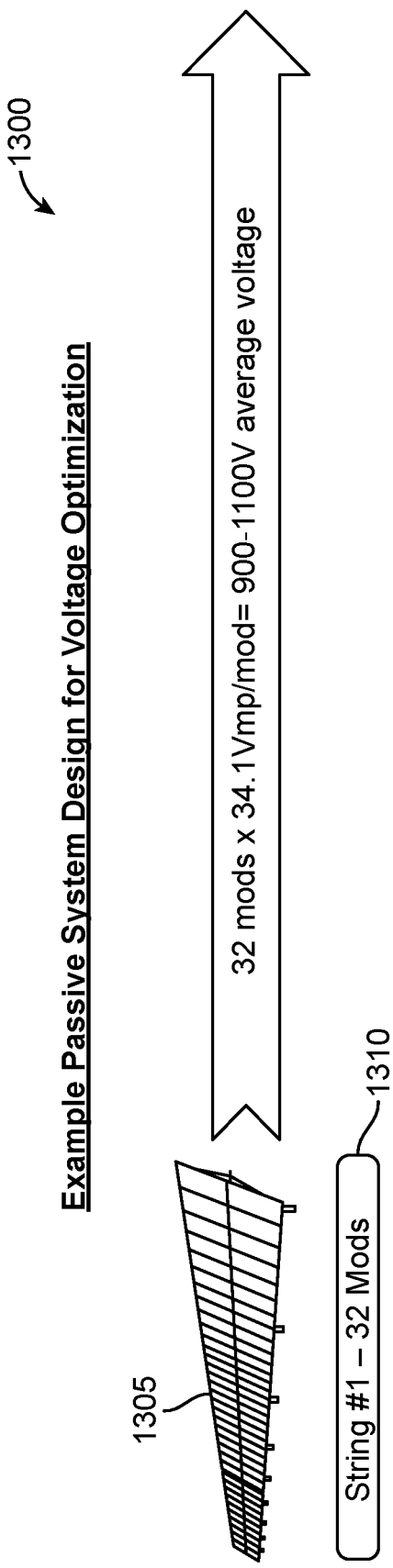
FIGS. 12A and 12B illustrate the ability to optimize the voltage for transmission when comparing solar power systems implemented with the passive system design versus the active system design.
Figure 12B:
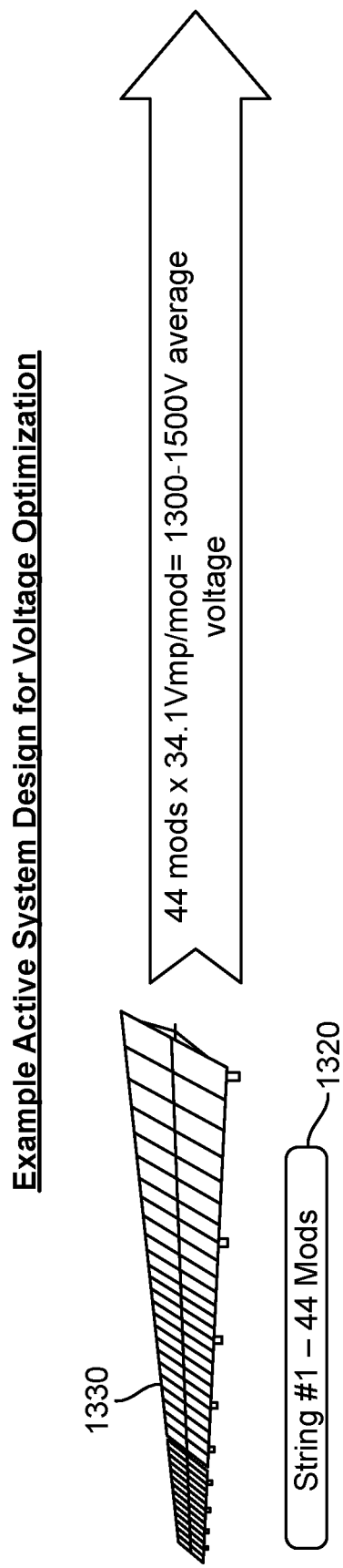

FIGS. 12A and 12B illustrate the ability to optimize the voltage for transmission when comparing solar power systems implemented with the passive system design versus the active system design. For this example, solar power system (1300), depicted in FIG. 12A, includes 32 PV modules in a single PV string. Thus, the average voltage produced by a string is around 900 to 1100 V. In contrast, the solar power system (1330) depicted in FIG. 12B incorporates 44 PV modules per string, resulting in an average PV string voltage of 1300 to 1500 V. By increasing the average operating voltage by +/−300V, line resistance is lowered and more energy is harvested (i.e., approximately 0.3% power gain improvement).

As is well known in the field of power transmission, to move electricity long distances, electrical voltages are increased dramatically to lower transmission "line losses." High voltages are used in transmission systems because a higher voltage implies a lower current for a given power of transmission. With a lower current, less heat is generated in the transmission lines and so less energy is wasted. Since the active design system, as compared to the passive design system, increases the average operating voltage of a power plant, then less heat is generated in the transmission lines, and consequently, more energy is harvested. Consequently, as voltage in a PV power plant increases, the "line loses" of electricity decreases, and more electricity is harvested from the same PV power plant. Accordingly, the active system design improves voltage optimization for transmission of power, resulting in less loss of energy.

In some embodiments, a designer of a solar power system, which configures the system in accordance with the active system design methodology, may execute a process to determine an optimal number of PV modules per string. The basic premise for the active system design methodology is based on a regulatory voltage specification. In a DC PV source circuit, or output circuit, the maximum PV system voltage for that circuit shall be calculated as the maximum regulatory voltage divided by the rated maximum power point voltage (Vmp) of the PV module connected series, rounded down, and corrected for the lowest expected ambient temperature, using Conversion Table 1.

CONVERSION TABLE 1
Correction factor for lowest ambient temperature

| Ambient Temperature °F | Correction: Add Module | Ambient Temperature °C |
|---|---|---|
| −11 to −26 | +1 | −24 to −31 |
| 3 to −10 | +2 | −16 to −23 |
| 16 to 2 | +3 | −9 to −15 |
| 28 to 17 | +4 | −2 to −8 |
| 41 to 29 | +5 | 5 to −1 |
| 52 to 42 | +6 | 11 to 6 |

As an example, a geographically location for a PV string has a lowest ambient temperature of −17 C, a 1,500V maximum regulatory voltage of a PV string, and a PV module with a Vmp of 34.7V using (STC) Standard Test Conditions (i.e., standard test conditions (STC) of irradiance of 1000 W/m$^2$, spectrum AM 1.5 and cell temperature of 25° C.).

Step 1: Divide 1,500V by a PV module with a Vmp of 34.7V=43.227 modules

Step 2: Round Down=43 modules per string.

Step 3: Add correction factor from Conversion Table 1. −17° C.=+2 modules

Step 4: 43+2=45 modules per string

First, to specify a system with an active design, a maximum regulatory full page of a PV string is determined. As discussed above, the maximum regulatory voltage of a PV string is set by the governing authority. For example, the maximum regulatory voltage of a PV string may be 1500 volts.

To configure the system, a number of PV modules are selected for a PV string based on a relatively low occurrence that the site conditions (temperature and irradiance) will place the PV modules in an operating condition that would exceed the maximum regulatory voltage of a PV string.

Figure 13:
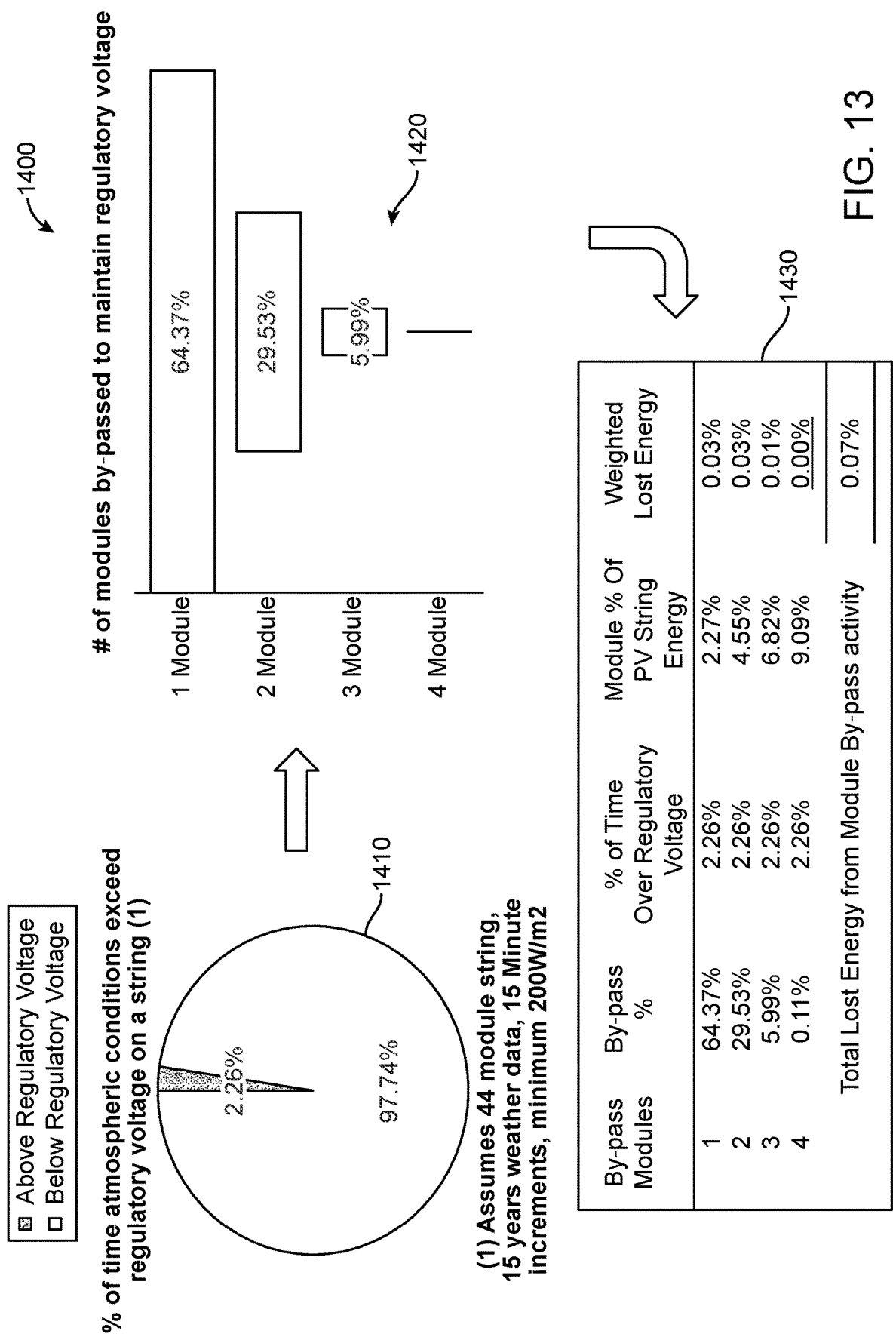
FIG. 13 illustrates an example system configured with 44 modules per string for which operating conditions (temperature and irradiance) at a site result in either exceeding the maximum regulatory voltage of a PV string or staying within compliance of the maximum regulatory voltage.

FIG. 13 illustrates an example system configured with 44 modules per string for which operating conditions (temperature and irradiance) at a site result in either exceeding the maximum regulatory voltage of a PV string or staying within compliance of the maximum regulatory voltage. For the 44 PV module string example, as shown in pie chart 1410, 96.74% of the time the atmospheric conditions result in PV string voltages that fall below the maximum regulatory voltage, and only 2.26% of the time the atmospheric conditions exceed the maximum regulatory voltage of a PV string. The chart (1410) of FIG. 13 is based on 15 years of weather data, recorded in 15-minute intervals, with a minimum system output of 200 W/M2.

FIG. 13 further illustrates, in bar chart 1420, the number of modules bypassed in order to maintain the string voltage below the maximum regulatory voltage for the atmospheric conditions depicted in chart (1410). As shown, for the 2.26% of time atmospheric conditions result in excessive regulatory string voltage, 64.37% of the time one module must be bypassed in order to maintain regulatory voltage; 29.53% of the time two modules must be bypassed to maintain regulatory voltage; and 5.99% of the time 3 modules must be bypassed to maintain regulatory voltage.

FIG. 13 further shows, in table 1430, the total loss of energy from bypassing one or more PV modules. Specifically, if one PV module is bypassed, then the module percent of PV energy is decreased by 2.27%, and the weighted lost energy is equal to 0.03%. In the conditions where two PV modules are bypassed, 4.55% of module energy of a PV string is lost, resulting in a weighed loss energy of 0.03%. Under conditions for which three bypass modules are engaged, 6.82% of module energy of a PV string is lost, resulting in a weighted lost energy of 0.01%. Thus, given the atmospheric conditions example of FIG. 13, the total lost energy from deploying the active system (actively bypassing modules) is only 0.07%.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A solar power system, comprising:
a plurality of photovoltaic (PV) modules;
at least one PV string to couple a plurality of the PV modules to generate a PV string voltage;
wherein, a number of PV modules per PV string is configured based on an irradiance and temperature at a site of the solar power system such that the number of PV modules causes the PV string voltage to exceed a maximum voltage specification of an electrical code governing the solar power system when operating at a lowest expected ambient temperature at the site, but only exceeds the maximum voltage specification for a limited number of occurrences for which the irradiance and temperature at the site cause the PV string voltage to exceed the maximum voltage specification;
at least one bypass photovoltaic module;
at least one voltage bypass circuit coupled, in series, to the bypass photovoltaic module, to selectively bypass the bypass photovoltaic module so as to eliminate the bypass photovoltaic module from the PV string voltage; and
string voltage control, coupled to the voltage bypass circuit, to detect the PV string voltage and to signal the voltage bypass circuit to eliminate the at least one bypass photovoltaic module when the irradiance and temperature at the site cause the PV string voltage to exceed the maximum voltage specification.

2. The solar power system as set forth in claim 1, wherein:
the at least one bypass photovoltaic module comprises a plurality of bypass photovoltaic modules;
the at least one voltage bypass circuit comprises a plurality of voltage bypass circuits; and
the voltage bypass circuits are coupled in series to the bypass photovoltaic modules.

3. The solar power system as set forth in claim 1, further comprising an converter coupled in series to the voltage bypass circuit.

4. The solar power system as set forth in claim 1, wherein the voltage bypass circuit comprises a bypass field effect transistor.

5. The solar power system as set forth in claim 1, wherein the bypass control circuit comprises a status LED to indicate at least one of the bypass photovoltaic modules have been eliminated from the PV string.

6. The solar power system as set forth in claim 1, wherein the number of photovoltaic modules on the PV string of the solar power system is increased over a conventional solar power system comprising an increased number of photovoltaic modules on a PV string than the solar power system, thus the solar power system requires less PV wire, connectors, combiner boxes, and trenching than the conventional solar power system.

7. The solar power system as set forth in claim 1, wherein the number of photovoltaic modules is increased for the PV string over a conventional solar power system configured based on the lowest expected ambient temperature at the site, wherein the solar power system comprises at least one tracker, which comprises at least one motor and a controller, configured to optimize the irradiation on the surface of the photovoltaic modules for the PV string, thereby increasing an amount of power produced by the PV string on the tracker over a conventional solar power system and correspondingly lowering a cost for the tracker, the motor and the controller.

8. The solar power system as set forth in claim 1, wherein, the number of photovoltaic modules is optimized for energy transmission over a reduced number of PV modules per PV string configured based on the lowest expected ambient temperature at the site.

9. The solar power system as set forth in claim 1, wherein the number of photovoltaic modules comprises approximately 44 photovoltaic modules comprising a PV string voltage of approximately 1496 volts.

10. A method for operating a photovoltaic (PV) string in a solar power system, comprising:
selecting a number of photovoltaic (PV) modules for a PV string, including at least one bypass photovoltaic module, based on an irradiance and temperature at a site of a solar power system such that the number of PV modules causes a PV string voltage to exceed a maximum voltage specification of an electrical code governing the solar power system when operating at at a lowest expected ambient temperature at the site, but only exceeds the maximum voltage specification for a limited number of occurrences for which the irradiance and temperature at the site cause the PV string voltage to exceed the maximum voltage specification;
selectively bypassing, in a voltage bypass circuit, the bypass photovoltaic module so as to eliminate the bypass photovoltaic module from the PV string voltage; and
detecting the PV string voltage in a string voltage control circuit to signal the voltage bypass circuit to eliminate the at least one bypass photovoltaic module when the irradiance and temperature at the site cause the PV string voltage to exceed the maximum voltage specification.

11. The method as set forth in claim 10, wherein:
the at least one bypass photovoltaic module comprises a plurality of bypass photovoltaic modules;
the at least one voltage bypass circuit comprises a plurality of voltage bypass circuits; and
the voltage bypass circuits are coupled in series to the bypass photovoltaic modules.

12. The method as set forth in claim 10, further comprising an converter coupled in series to the voltage bypass circuit.

13. The method as set forth in claim 10, wherein the voltage bypass circuit comprises a bypass field effect transistor.

14. The method as set forth in claim 10, further comprising a status LED on the bypass control circuit to indicate that at least one of the bypass photovoltaic modules have been eliminated from the PV string.

15. The method as set forth in claim 10, wherein the number of photovoltaic modules on the PV string of the solar power system is increased over a conventional solar power system comprising an increased number of photovoltaic modules on a PV string than the solar power system, thus the solar power system requires less PV wire, connectors, combiner boxes, and trenching than the conventional solar power system.

16. The method as set forth in claim 10, wherein the number of photovoltaic modules is increased for the PV string over a conventional solar power system configured based on the lowest expected ambient temperature at the site, wherein the solar power system comprises at least one tracker, which comprises at least one motor and a controller, configured to optimize the irradiation on the surface of the photovoltaic modules for the PV string, thereby increasing an amount of power produced by the PV string on the tracker over a conventional solar power system and correspondingly lowering a cost for the tracker, the motor and the controller.

17. The method as set forth in claim 10, wherein, the number of photovoltaic modules is optimized for energy transmission over a reduced number of PV modules per PV string configured based on the lowest expected ambient temperature at the site.

18. The method as set forth in claim 10, wherein the number of photovoltaic modules comprises approximately 44 photovoltaic modules comprising a PV string voltage of approximately 1496 volts.

* * * * *